Sept. 2, 1924.
F. S. NASH ET AL
1,506,991
VALVE CONSTRUCTION FOR INTERNAL COMBUSTION ENGINES
Filed April 1, 1922    3 Sheets-Sheet 2
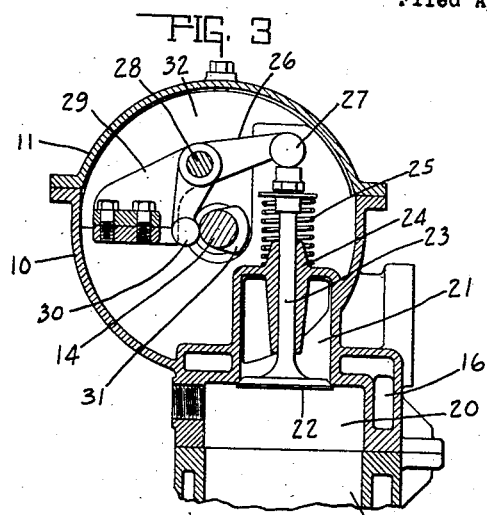
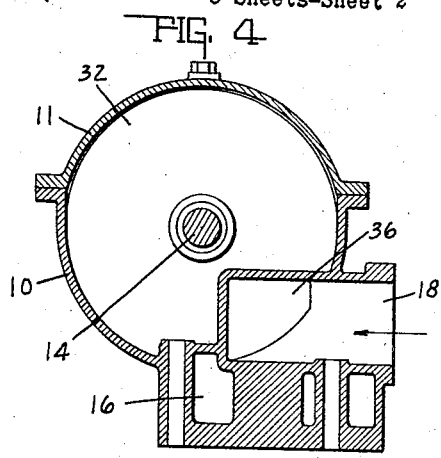
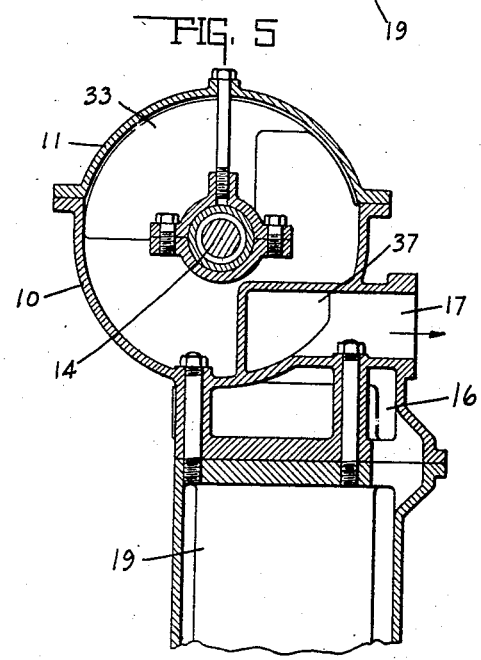
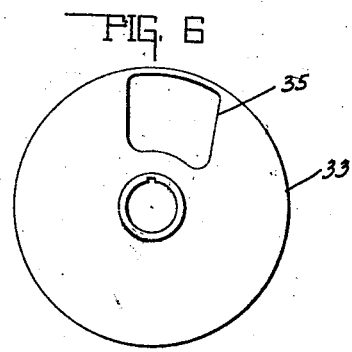
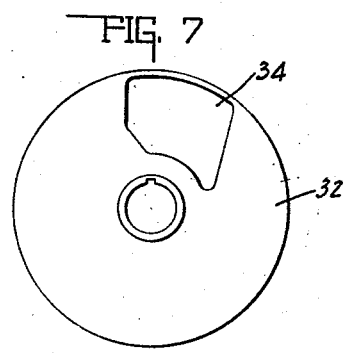
INVENTORS
WILLIAM H. HARRIS.
FRED S. NASH.
BY CONSTANTINE P. SCHWARZ,
ATTORNEYS.

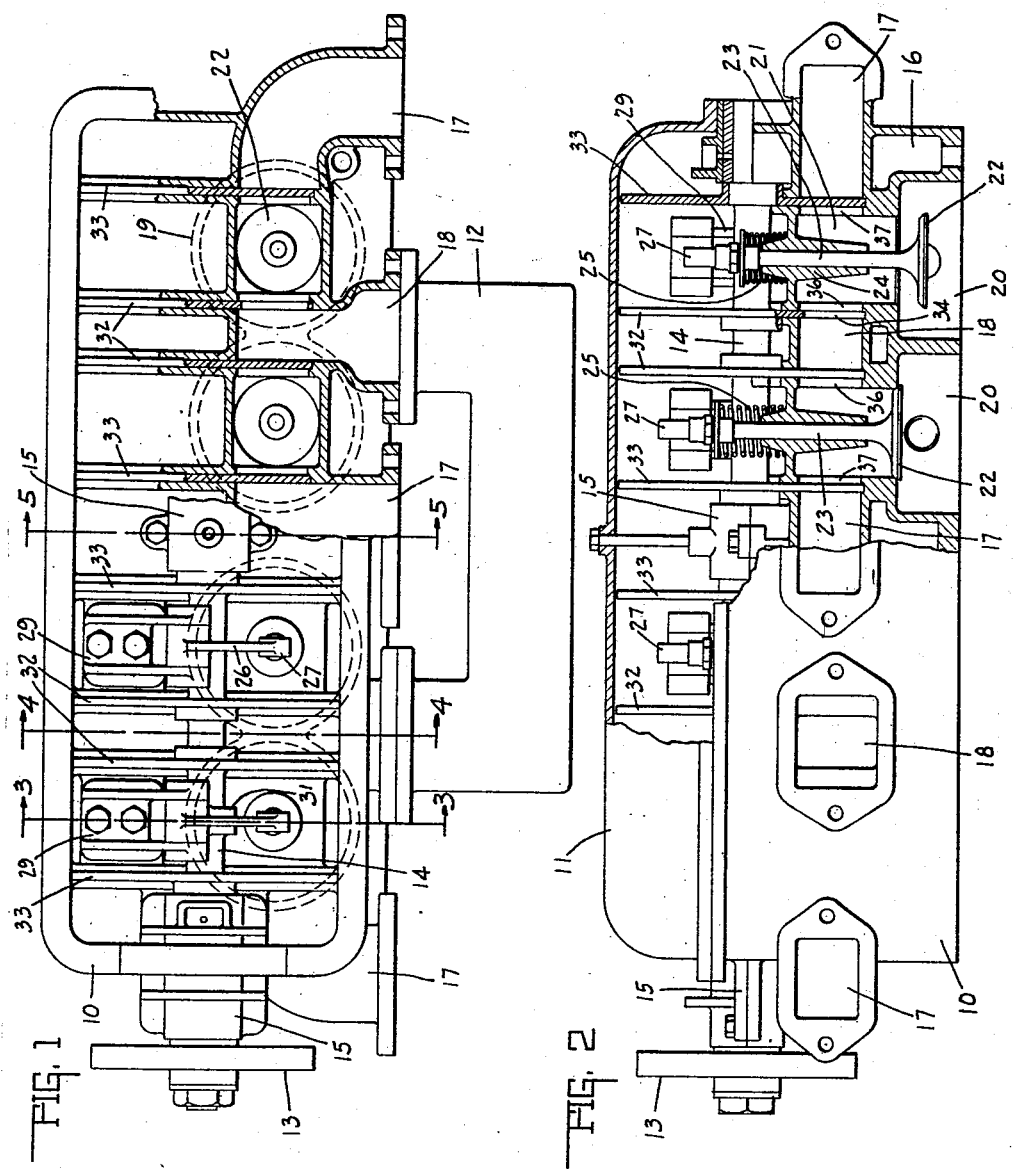

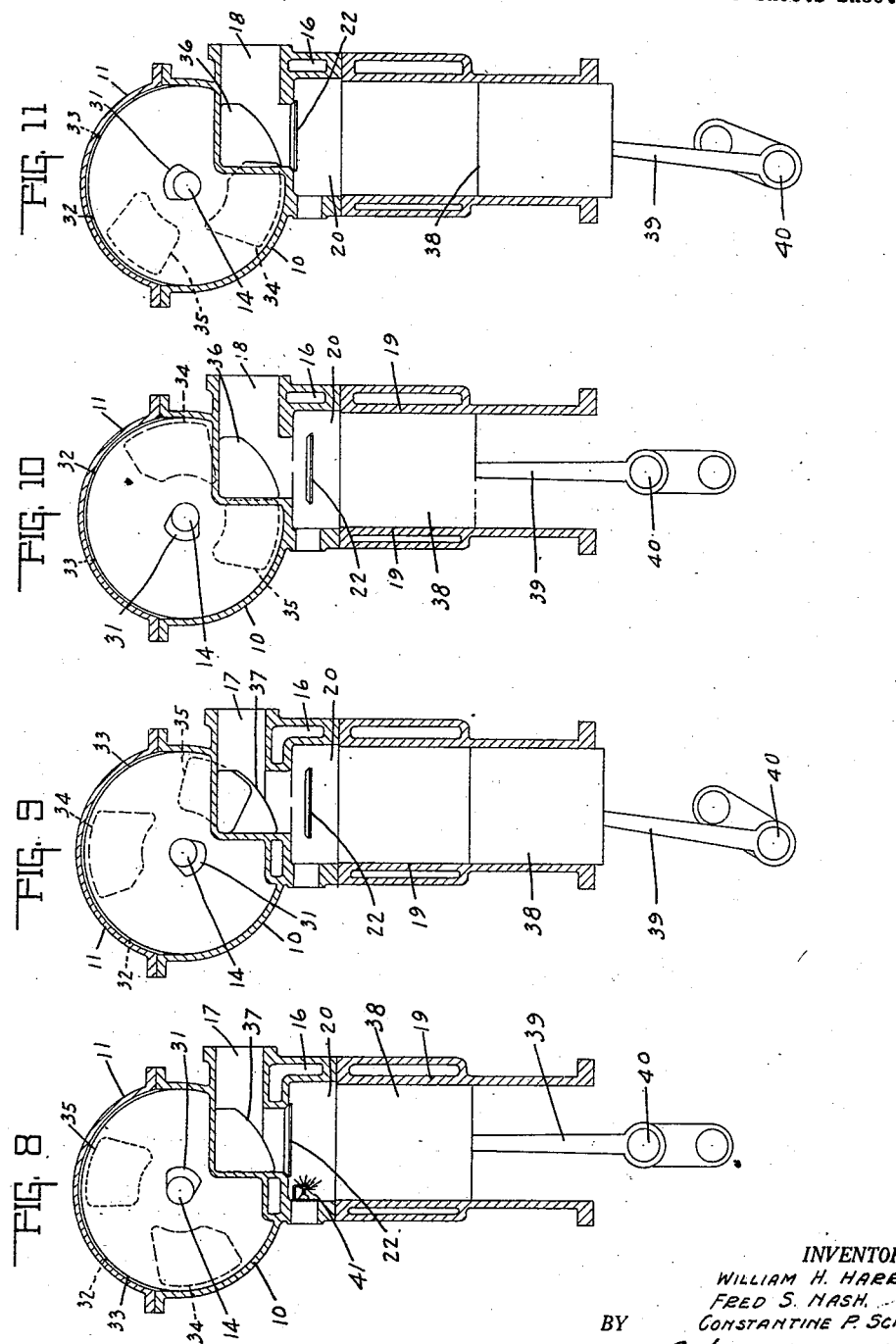

Patented Sept. 2, 1924.

1,506,991

UNITED STATES PATENT OFFICE.

FRED S. NASH, OF CINCINNATI, OHIO, WILLIAM H. HARRIS, OF INDIANAPOLIS, INDIANA, AND CONSTANTINE P. SCHWARZ, OF CINCINNATI, OHIO; SAID NASH AND SAID SCHWARZ ASSIGNORS TO SAID HARRIS.

VALVE CONSTRUCTION FOR INTERNAL-COMBUSTION ENGINES.

Application filed April 1, 1922. Serial No. 548,807.

*To all whom it may concern:*

Be it known that we, FRED S. NASH, WILLIAM H. HARRIS, and CONSTANTINE P. SCHWARZ, citizens of the United States, and residents of Cincinnati, Indianapolis, and Cincinnati, respectively, counties of Hamilton, Marion, and Hamilton, respectively, and States of Ohio, Indiana, and Ohio, respectively, have invented a certain new and useful Valve Construction for Internal-Combustion Engines; and we do hereby declare that the following is a full, clear, and exact description thereof, reference being had to the accompanying drawings, in which like numerals refer to like parts.

This invention relates to an internal combustion engine of the type commonly used in motor driven vehicles, and more particularly to the four cycle engine having a single valve communicating with the combustion chamber through which both the intake and the exhaust pass, the intake and exhaust being controlled by means other than the single combustion chamber valve.

This type of valve controlled engine has been well known for sometime, but the commercial production thereof has heretofore been very much limited.

It is the object of this invention to provide a valve control of the single valve type directed toward the reduction or cheapening of the manufacturing cost, because of the fewer working parts, the simplified machine work not requiring the same accuracy and the simplified head casting.

It is the further object of the invention to provide such a type of valve mechanism as will be more efficient than those heretofore disclosed by reason of the construction and arrangement of the valves and because of the less power consumed in the driving cam shaft.

One of the objects of the invention is to decrease the compression pressure but keep the volumetric efficiency of the engine up to a point by means of increased valve passage area where there will be at least as much, and possibly considerably more, power generated by the engine, at the same time eliminating the knocking condition because of the decreased compression pressure. It is well known that the knocking phenomena, which is perhaps one of the most serious facing the internal combustion engine industry today, is caused by the grades of fuel now being used. Such knocking condition, while caused by the use of heavier fuels, is controlled by varying the compression pressure. A high compression pressure makes the engine knock, while low compression pressure eliminates the knock. With the conventional type of valve mechanism, namely one intake and one exhaust valve, there may be a certain volumetric efficiency with a certain compression pressure, but if the compression pressure is decreased the volumetric efficiency of the engine, and consequently the power thereof, is also decreased. By reason of the valve construction herein disclosed such decrease in compression pressure may be obtained without effecting the volumetric efficiency or power of the engine.

The principle of allowing the exhaust gas to go out and the intake to go in through the single valve, opens up several possibilities. The valve is chilled by the ingoing gas so it will not pit or burn, but at the same time is heated by the exhaust so as to increase the volatilization of the intake charge, whereby a heavier fuel may be used and more perfect combustion insured. This effects a saving and more economical operation.

A further object of the invention is to so construct the cylinder head as to give the combustion chamber such a shape that, combined with the discharge of fuel through the centrally located valve, tends to help in elimination of the so called fuel knock. This arrangement of the cylinder head also provides a hot spot, since there is only a thin partition, the thickness of the cylinder head, between the passage and the combustion chamber, so that the heat generated in the latter will heat and volatilize the fuel in the intake passage. Since this is the only horizontal surface in the induction system, it can be readily seen that this surface is well heated and helps to keep the fuel vaporized.

The full nature of this invention will be understood from the accompanying drawings and the following description and claims.

In the drawings Fig. 1 is a plan view looking down on the motor with the cylinder head removed and a portion thereof shown in horizontal cross section. Fig. 2 is a side elevation of the engine with a portion thereof shown in central vertical cross section. Fig. 3 is a section taken on the line 3—3 of Fig. 1. Fig. 4 is a section taken on the line 4—4 of Fig. 1. Fig. 5 is a section taken on the line 5—5 of Fig. 1. Fig. 6 is a plan view of the exhaust valve disk. Fig. 7 is a plan view of the intake valve disk. Fig. 8 is a diagrammatic illustration of the position of the valves and piston on top center at the time of firing. Fig. 9 is the same as Fig. 8 showing the position at the exhaust stroke thirty degrees above bottom center. Fig. 10 is the same as Fig. 8 showing the position at the top center of exhaust stroke. Fig. 11 is the same as Fig. 8 showing the position past the bottom center or suction stroke.

In the drawings there is shown an internal combustion engine having a cylinder head 10 on which is mounted the cover head 11, intake manifold 12 and timing gear 13. Extending longitudinally and centrally through the block there is a cam shaft 14 mounted in the bearings 15 and keyed to the timing gear 13. The cylinder head is provided with the usual water jacket chambers 16, the exhaust passageways 17 and intake passageways 18. There are shown herein four cylinders 19 having combustion chambers 20 opening into the single intake and discharge passage 21 controlled by the single poppet valve 22 mounted centrally in the top of the combustion chamber. The poppet valve 22 is mounted on the valve stem 23 which extends through a bearing 24 and is normally held in closed position by the compression spring 25. Said valve is actuated in the usual manner by means of a rocker arm 26 having a head 27 adapted to bear down on the top of the valve stem, said rocker arm being pivotally mounted at 28 on the brackets 29 mounted upon the block and having a roller 30 adapted to engage the cam 31 keyed on the cam shaft 14, whereby said valve will be opened upon each revolution of the cam shaft and closed by the spring 25.

Keyed upon said cam shaft on each side of the intake and exhaust passage 21 there are intake and exhaust valve disks. Adjacent each other and separating the passages 21 from the intake ports 18, there are intake valve disks 32, as shown in Fig. 2 and 7. On the opposite sides of said passageways 21 and separating the same from the exhaust ports 17, there are exhaust valve disks 33, as shown in Figs. 2 and 6, said disks being keyed upon the cam shaft 14 revolving therewith with their faces bearing against the walls of the passageways 21. Said passageways have ports or openings communicating with the intake and exhaust ports 18 and 17 on each side thereof. The valve disk 32 is provided with a port 34 and a disk 33 with a port 35, said ports being so positioned on said disks as to register with the openings between the passageway 21 and the intake and exhaust ports at properly timed intervals for admitting the fuel and discharging the exhaust, as will hereinafter be more fully described. For convenience the ports between the passage 21 and the intake ports 18 will be in-indicated as 36 and the ports between said passage and the exhaust port 17 will be indicated by 37.

In Figs. 8 to 11 there is shown diagrammatically a piston 38 operable in the cylinder 19 mounted on the piston rod 39 connected with the crank shaft 40. There is also shown a spark plug 41 for firing the charge in the cylinder. The operation of the engine is such that when the charge is fired and the piston is on top center, as shown in Fig. 8, the central poppet valve 22 is closed against the compression of expanding gases, whereby the piston is forced downwardly. Upon the return or exhaust stroke of the piston, as shown in Fig. 9, the exhaust disk valve 33 is turned to such a position that the port 35 registers with the port 37, the poppet valve 22 opens and the exhaust is expelled through the passageway 21, port 37 and exhaust port 17. Upon the piston reaching its top center position and starting on the downward or intake stroke, as shown in Fig. 10, the poppet valve 22 remains open. The exhaust disk valve is moved to the position wherein the port 35 has just ceased to register with the port 37, and the intake valve disk is moved to a position wherein its port is about to register with the port 36. The cylinder has at this point been completely scavenged and all exhaust gases discharged. The downward movement of the piston sucks in the fuel gases as the further rotary movement of the disk 32 causes the port 34 to register with the port 36. The gas is then drawn through the intake port 18, ports 35 and 36 and passageway 21 through the valve 22, which has remained open, into the combustion chamber. Upon completion of the suction stroke the poppet valve 22 is closed while the ports 34 and 36 are still registering, thus allowing the fuel in the vapor state to rebound, due to the ramming effect of the gas in the intake manifold and scavenging the port 21 so this gas is not blown out on the next succeeding exhaust stroke. Upon the piston reaching the top center position, as shown in Fig. 8, the charge which has been compressed is then fired.

From this arrangement it will be noted that the valve area controlled by the poppet valve 22 for admitting and discharging the gas may be of greatly increased size over valves used in the usual construction, whereby the cylinder is more completely scavenged and a larger charge of fuel is taken in. It will be further observed that the passageway 21, or the fuel intake and exhaust, is comparatively small so that a minimum of exhaust or intake gas remains therein after the respective valve disks close, whereas heretofore such chambers have been of such size as to discharge considerable fuel through the exhaust and draw exhaust gases back into the cylinder with the incoming fuel. The construction herein shown minimizes this objection, overcoming the difficulties experienced thereby.

The invention claimed is:

1. A valve construction for an internal combustion engine having a combustion chamber, including a single overhead poppet valve opening into an overhead passageway, intake and exhaust ports communicating with each of said passageways respectively, a vertically positioned rotary intake valve disk extending between said passageway and intake port having a port therein adapted to register with said intake port for permitting a charge of fuel to enter said chamber through the passageway and poppet valve when open, a vertically positioned rotary exhaust valve disk extending between said passageway and exhaust port, said disk having a port therein adapted to register with said exhaust port for permitting exhaust gas to be discharged through said poppet valve and passageway when said valve is open, a cam shaft mounted in said engine for actuating said poppet valve and rotating said disk valves which are centrally keyed thereon for opening and closing the same at timed intervals for controlling the intake and exhaust gas therein, and a substantially semi-cylindrical cylinder head secured on said engine for enclosing said valves whereby a substantially cylindrical housing is provided therefor.

2. A valve construction for an internal combustion engine having a combustion chamber and a single passage thereto, a poppet valve controlling said single passage, intake and exhaust passages communicating with said passage and extending oppositely from the opposite sides of said common passage, a disk valve positioned at each side of said common passage and controlling the communication thereto with the adjacent passage, means for actuating said poppet valve, and a single cam shaft for rotating said disk valves and having a cam positioned intermediate said disk valves for actuating the poppet valve operating means.

3. A valve construction for an internal combustion engine having a combustion chamber, and a single passage thereto, a poppet valve controlling said single passage and having an actuatable portion extending through the same, intake and exhaust passages communicating with said passage and extending oppositely from the opposite sides of said common passage and entirely avoiding said poppet valve actuatable portion, a disk valve positioned at each side of said common passage and controlling the communication thereto with the adjacent passage, a rocker arm for actuating said poppet valve actuatable portion and positioned intermediate said disk valves, a cam shaft positioned at one side of said common passage and secured to said disks for rotating the same, and a cam carried by said cam shaft between said disks for actuating said rocker arm.

In witness whereof, we have hereunto affixed our signatures.

FRED S. NASH.
WILLIAM H. HARRIS.
CONSTANTINE P. SCHWARZ.